United States Patent Office 3,389,303
Patented June 18, 1968

3,389,303
CONTROLLING NETWORK
Nathaniel D. Tenenbaum, Plainfield, N.J., assignor to Westinghouse Electric Corporation, Pittsburgh, Pa., a corporation of Pennsylvania
Filed Oct. 18, 1965, Ser. No. 497,180
17 Claims. (Cl. 317—22)

ABSTRACT OF THE DISCLOSURE

A standby energy supply system for a power network protecting relay which should always be ready for instant actuation even though its normal energy supply is inoperative. Under normal condition the energy for actuating the relay is supplied from the normal supply. In the event the normal energy supply fails, the standby energy supply such as a battery is connected to supply energy to a portion only of the relay during the period in which the network is operating normally to conserve the standby energy supply. If the network faults and the relay is actuated during the period that the normal energy supply is inoperative, the operation of the relay connects the standby supply to the entire relay apparatus for a time interval sufficient for the relay to disconnect the faulted network from the power busses.

---

This invention relates to power controlling networks for protective relaying apparatus and has particular relation to a protecting relaying apparatus which embodies a storage battery, a charging circuit for the storage battery and power consuming apparatus which consumes power over a standby period at one level. Usually such apparatus has an increased power consumption when actuated in response to a fault.

In accordance with the invention, a protecting relaying apparatus which is normally energized from a battery which is "trickle-charged" from a main source of energy such as a 240 volt A.C. station service is provided with a voltage sensitive relaying apparatus to disconnect the major portion of the voltage consuming devices from the battery supply when the charging circuit for the battery is interrupted. This provides for minimum battery drain during the period that the station power service is lost to provide for a maximum interval of line protection. In the event of the occurrence of a fault during this period of loss of station power service, the disconnected power consuming equipment is reenergized by the fault responsive network by the continuously connected low energy consuming apparatus prior to or concurrently with the actuation of the high drain power consuming devices upon the occurrence of the fault signal.

It is an object of this invention to provide a system for removing the major portion of the standby energy consuming apparatus in the event of the interruption of the normal energy source to maintain operation of the protecting apparatus for the maximum time.

Another object is to provide for re-establishing the energization of the protecting apparatus from the battery as a consequence of the occurrence of a fault signal.

It is a further object of this invention to utilize the fault timing interval to permit the re-energization of the disconnected portion of the apparatus prior to the initiation thereof in response to the fault.

Other objects of the invention will be apparent from the following description, the appended claims and the accompanying drawings, in which:

Figure 1A:
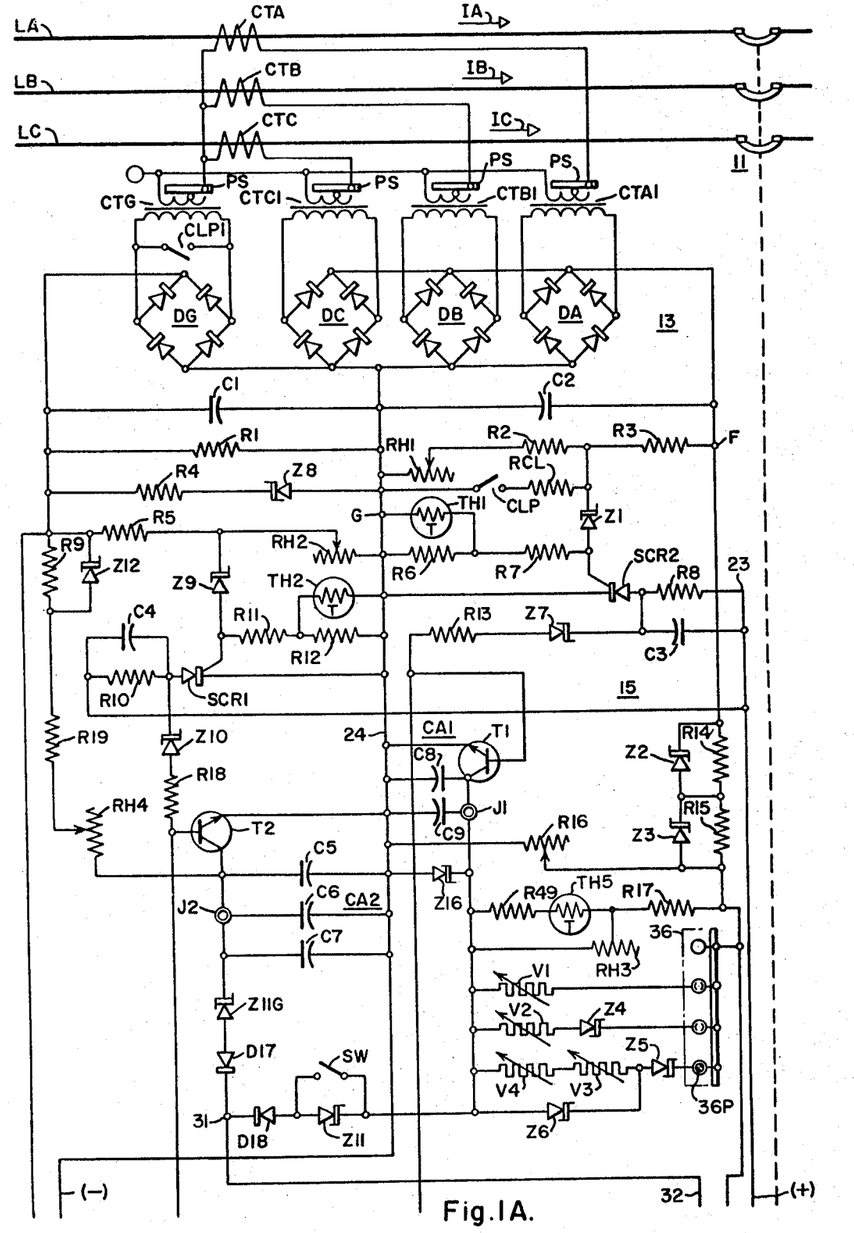
FIGS. 1A and 1B and 1C collectively represent a schematic view of an electric fault protecting system embodying the invention (FIG. 1B should be placed below FIG. 1A and FIG. 1C should be placed below FIG. 1B).
Figure 1B:
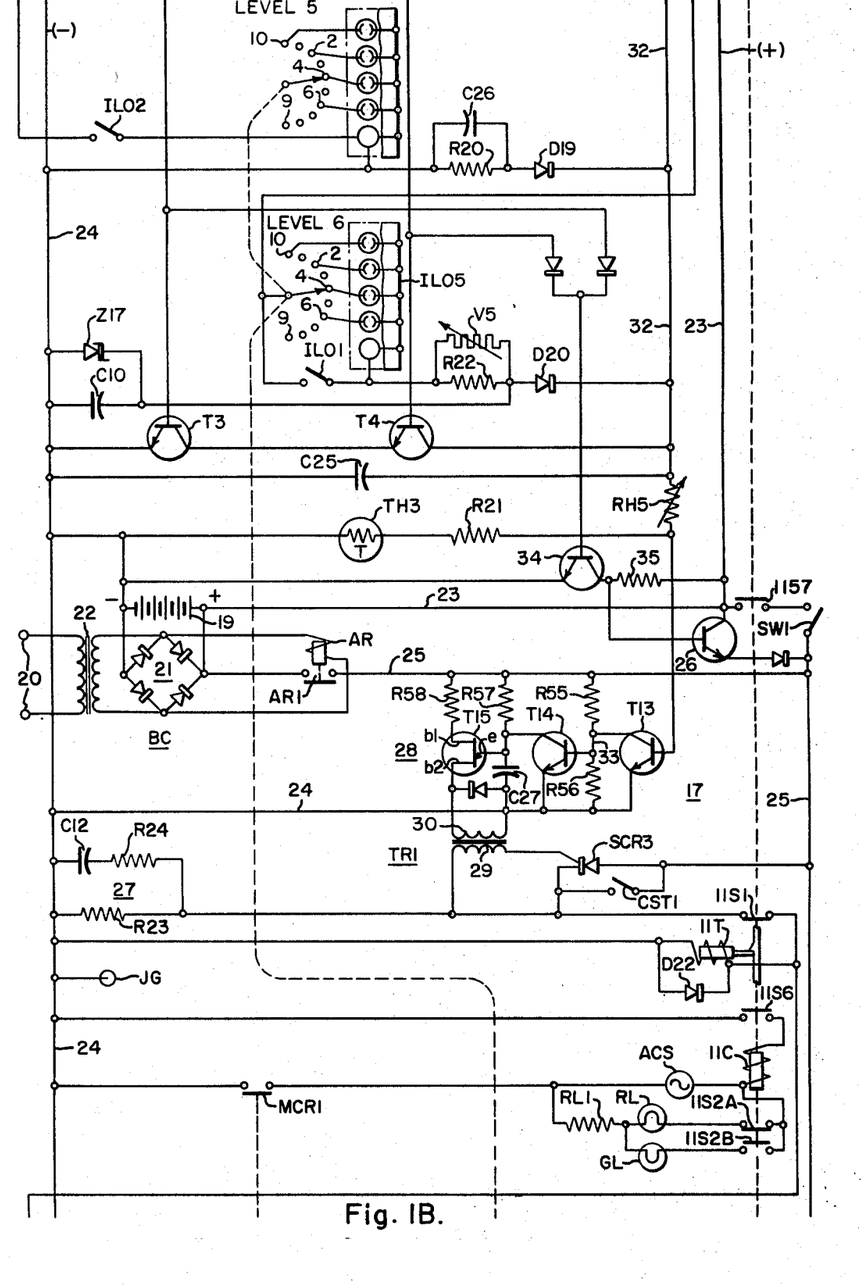
Figure 1C:
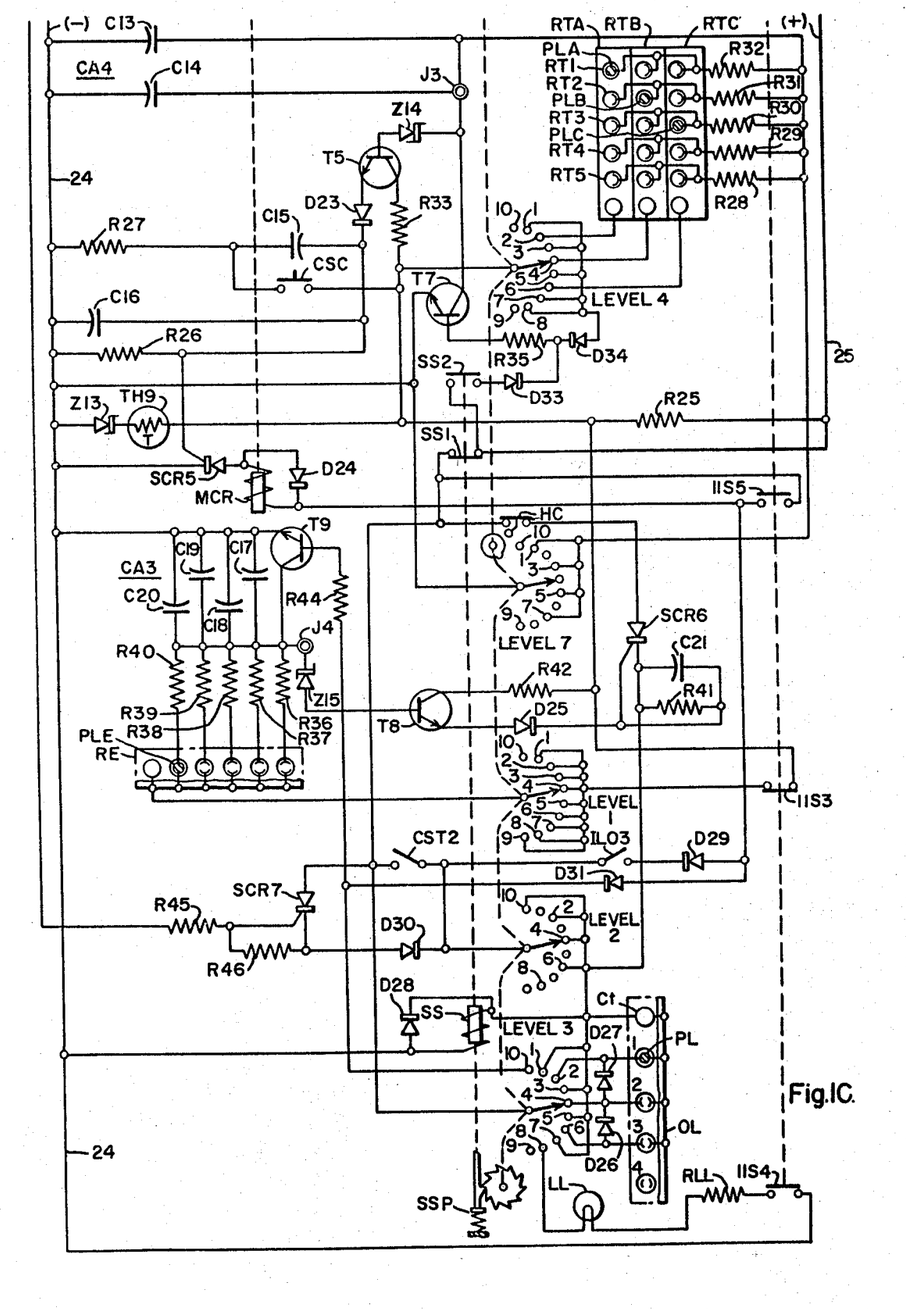

FIGS. 1A, 1B and 1C show a re-closing circuit breaker combination which is associated with an electric system to be protected. This system which is to be protected may be of any type having a condition to which the combination is to respond. For present purposes it will be assumed that the system is a three-phase network operating at a power frequency of 60 cycles per second and represented by three-phase or line conductors LA, LB and LC. These line conductors transmit alternating currents IA, IB, IC, respectively from a suitable source through a circuit breaker 11 having a closing motor 11C and a trip coil 11T. The circuit breaker has three auxiliary switches 11S1, 11S2A and 11S3 which are open when the circuit breaker is in closed condition. The circuit breaker 11 is shown in its closed condition.

The circuit breaker has auxiliary switches 11S2B, 11S4, 11S5, 11S6 and 11S7. These switches are closed when the circuit breaker is in its open condition and are open when the circuit breaker is in its closed condition.

The re-closing circuit breaker combination is designed to respond to a suitable condition of the electric system which is to be protected. In a preferred embodiment of the invention the combination comprises an over-current relay assembly which responds to currents flowing through the line conductors.

The relay assembly includes a converter unit 13 which derives from the phase currents IA, IB and IC a direct voltage which is applied between points F and G and which is dependent on the largest of the three line currents. This direct voltage is applied to a timing unit 15 for the purpose of controlling the charging of a capacitor unit CA1 which may include one or more capacitors, in the illustrated case capacitors C8 and C9. When the voltage across the capacitor unit CA1 exceeds a predetermined value a signal is applied to a tripping unit 17 for the purpose of initiating a tripping operation of the circuit breaker 11. The circuit breaker 11 may subsequently be re-closed by energization of its re-closing coil or motor 11C under operation of the apparatus illustrated in FIG. 1C.

During normal operation of the relaying apparatus the battery 19 is normally connected to an alternating source of charging potential (not illustrated) through a suitable battery charging network BC which is connected to the input terminals 20. The charging network BC is preferably of a capacity to maintain the battery 19 fully charged at all times during standby but does not necessarily have sufficient capacity to furnish the power necessary to trip or reset the breaker 11. The battery charging network BC as illustrated includes a full wave rectifying network 21 connected to the terminals 20 through a suitable voltage changing transformer 22. With this arrangement, the battery 19 is continually being charged to replace the energy used therefrom to maintain energized the protective apparatus connected between the first and second pairs of potential supplying buses 25 and 23–24.

The bus 24 is solidly connected to one terminal of the battery 19 which as illustrated is the negative terminal. The positive terminal of the battery 19 is permanently connected to the bus 23 whereby this bus remains energized. The positive terminal of the battery 19 is selectively connected to the bus 25 through the contacts AR1 of a magnetic type relay AR. The energizing winding of the relay AR is connected to the alternating potential terminals of the rectifying network 21 whereby it responds to the existence of or absence of potential at the input terminals 20 to open or close its contacts AR1. Other connections are possible as long as the relay will close its contacts when energy is obtainable from the input terminals 20 and open its contacts AR1 when energy is not obtainable therefrom to charge the battery 19. The portion of the apparatus illustrated in FIGS. 1B and 1C connected to the buses 24 and 25 represents the apparatus which draws the major portion of the standby power and will be disconnected from the battery 19 whenever the power supplied to the battery charging circuit BC is interrupted.

In the event of the occurrence of a fault during the period in which the bus 25 is deenergized, the fault sensing mechanism will be actuated and, as will be described below, the bus 25 will be reenergized by means of a switching device 26. The device 26 may conveniently take the form of a transistor having its main electrodes connected between the buses 23 and 25 whereby the bus 25 is reconnected to the positive terminal of the battery 19. The transistor 26 will be rendered conducting as a consequence of the occurrence of the fault signal whereby the breaker is tripped. If the switch SW1 is open the breaker 11 will remain tripped since the opening of the breaker results in the disappearance of the fault signal and the rendering of the switching device 26 non-conducting. This arrangement protects the discharge of the battery 19 and any chance that the breaker could not retrip if the fault has not disappeared. In the event more than one protective network was energized from a common battery, it would insure a longer source of potential for protecting the other networks. Reenergization of the contacts 20 results in re-closure of the contacts AR1, reenergization of the bus 25 and a subsequent re-closure of the circuit breaker 11. If this feature is not desired, closure of the switch SW1 renders the auxiliary switch 11S7 effective to establish a shunting circuit around the switching device 26 when the breaker 11 is tripped to energize the bus 25 for the reclosing cycle of the breaker. In the disclosed apparatus, the opening of the relay contacts AR1 to deenergize the bus 25 results in an energy saving of substantially 95 percent of the energy drain on the battery 19 which would occur if the bus 25 remained energized.

As illustrated in FIG. 1A the fault sensing signal is derived from three current transformers CTA, CTB and CTC which have their primary windings energized in accordance with the line currents LA, LB and LC, respectively. The secondary windings of the current transformer CTA, CTB and CTC are respectively connected to the primary windings of the transformers CTA1, CTB1 and CTC1, located in the converter unit 13. Preferably, the primary windings of the current transformer CTA1, CTB1 and CTC1 have adjustable numbers of turns selected by suitable plug and socket assemblies PS to facilitate adjustment of the relay assembly.

The secondary windings of the transformers CTA1, CTB1 and CTC1 are connected to the input terminals of rectifiers DA, DB and DC, respectively. The rectifiers may be of any desired construction. Preferably they are full wave rectifiers and are illustrated as rectifiers of the bridge type in FIG. 1A.

The output terminals of the rectifiers are connected in parallel across a voltage divider represented by three resistors R3, R2 and RH1. For the purpose of calibration at least one of these resistors, preferably the resistor RH1, is adjustable. A filter capacitor C2 is connected across the output terminals of the rectifiers for purposes of removing ripple from the output and assuring the supply of a ripple-free direct voltage across the voltage divider. The parallel connection of the rectifier output results in a voltage across the voltage divider corresponding to the largest of the three input voltages to the rectifiers.

In the timing unit 15, the direct voltage appearing across the voltage divider is employed for charging a storage device such as a capacitor unit CA1. This direct voltage is applied across an adjustable resistor R16 through resistors R14 and R15 and is applied across the capacitor unit CA1 through the resistor R17 and through the parallel resistors R49 and RH3. Preferably, at least one of the resistors RH3 and R49 is adjustable to faciilitate calibration. Thus adjustment of the resistor RH3, adjusts the rate of charge of the capacitor unit CA1 and the time required for the capacitor to reach a predetermined terminal voltage. The time also may be adjusted by adjustment of the capacitance of the capacitor unit CA1.

For small values of the line currents the capacitor unit CA1 is shunted by a suitable switch which preferably takes the form of the emitter-collector circuit of a transistor T1. Although the circuits may be arranged for a transistor of the PNP type it will be assumed that the transistor T1 is of NPN type. As shown in FIG. 1A the collector of the transistor T1 is connected to the right-hand terminal of the capacitor unit CA1, whereas the emitter of the transistor is connected to the left-hand terminal of the capacitor unit.

For small values of line currents sufficient current is transmitted through the base or control circuit of the transistor T1 to place the transistor in conductive condition and thus to assure maintenance of the capacitor unit CA1 in a discharge condition. The base or control circuit of the transistor may be traced from the positive terminal source of direct voltage 19 (FIG. 1B) through bus 23, a resistor R8, a minimum voltage or threshold device such as a Zener diode Z7, a resistor R13, the base and the emitter of the transistor T1 and bus 24 to the negative terminal of the source of direct voltage 19. A 24 volt battery may be employed as the source 19 and is conventional but other secodnary sources may be used.

When the capacitor unit CA1 is to start a timing operation, the transistor T1 is rendered non-conducting, Specifically, this is accomplished by closing a switch SCR2 to shunt the input of the control circuit of the transistor T1. This shunting switch SCR2 preferably is a silicon control rectifier having its anode connected to a point intermediate the resistor R8 and the Zener diode 27 and its cathode connected to the emitter of the transistor T1. The gate of the controlled rectifier is connected to a point intermediate the resistors R2 and R3 through a minimum voltage or threshold device Z1.

For low values of voltage thereacross, the minimum voltage device Z1 is in effect an insulator and blocks the flow of current therethrough. When the voltage thereacross rises above a predetermined value the device Z1 breaks down to exhibit a relatively low resistance to the flow of current. When the voltage thereacross drops below the predetermined value, the device Z1 recovers its insulating properties. In a preferred embodiment of the invention this device takes the form of a Zener diode. Resistors R6 and R7 are connected in series between the gate and cathode of the controlled rectifier SCR2. A capacitor C3 is connected across the resistor R8 and the value of the components are selected to enable the silicon controlled rectifier to turn off and on depending on the signal at the gate of the controlled rectifier. This is due to the fact that the value of the resistance R8 is sufficiently high to prevent the minimum current flow through the silicon controlled rectifier SCR2 and the conductions thereof depend upon the charging current of the capacitor C3. As long as the signal supplied between the terminals G and F is sufficiently high to break over the Zener diode Z1, a conducting gate signal will be applied to the controlled rectifier SCR2 and cause it to reconduct. To indicate suitable parameters, the controlled rectifier is designed for an output current of the order of 200 milliamperes. The resistor R8 has a resistance of 27,000 ohms and the capacitor C3 has a substantial capacitance such as 47 microfarads.

The operation of the timing units will now be briefly reviewed. It will be assumed that the values of line currents flowing are too small to result in turn on of the controlled rectifier SCR2. Because of the current flowing from the positive terminal of the source 19 through the resistor R8, the Zener diode 27, the resistor R13, the base and emitter of the transistor T1 and bus 24 to the negative terminal of the source 19, the transistor T1 is turned on and establishes a low resistance path across the capacitor unit CA1. Consequently, the capacitor unit CA1 is in discharge condition.

It will be assumed next that the line current IA increases until it reaches fault value. As the current increases, a stage is reached at which the voltage across the Zener diode Z1 breaks over and current flows from an intermediate terminal of the voltage divider through the Zener diode Z1 and the resistors R7 and R6 back to the left-hand terminal of the voltage divider. The voltage drop across the resistors R7 and R6 turns on the controlled rectifier SCR2 and current then flows from the positive bus 23 through the resistor R8 and the anode and cathode of the controlled rectifier SCR2 to the negative bus 24.

Because of the low voltage, appearing between the anode and cathode of the controlled rectifier SCR2, the voltage across the Zener diode Z7 drops below the value required to maintain conduction therethrough and the current flowing through the base emitter circuit of the transistor T1 drops to turn off the transistor. Since the transistor T1 now represents a high resistance across the capacitor unit CA1 this capacitor unit starts to charge.

The voltage across the capacitor unit increases until a minimum voltage device Z11 breaks over. This minimum voltage device may be similar in construction to the device Z1. When the device Z11 breaks over the timing unit 15 delivers an input to the tripping unit 17 through a rectifier D18.

If the sharp breakdown point of the device Z11 is not desired, the device may be and in a preferred embodiment is shunted by manually operable switch SW.

Let it be assumed now that the line current IA starts to drop either after or before the capacitor unit CA1 is charged sufficiently to result in the breakdown of the device Z11. When the line current drops to a predetermined value, the Zener diode Z1 is restored to its blocking condition and the controlled rectifier SCR2 turns off.

Inasmuch as the controlled rectifier SCR2 is in the blocking condition, sufficient current flows from the positive terminal of the battery 19 to the circuit represented by the resistor R8, the Zener diode Z7, the resistor R13 and the base and the emitter of the transistor T1 to turn on the transistor. The transistor T1 now establishes a low resistance shunt across the capacitor unit CA1 and the capacitor unit CA1 is rapidly discharged through the transistor. This completes a cycle of operation of the timing unit 15.

When the timing unit 15 delivers an input to the tripping unit 17 (FIG. 1B) the tripping unit trips the circuit breaker 11. This tripping unit is energized from a source of direct voltage such as the battery 19 from the busses 24 and 25.

The trip coil 11T of the circuit breaker 11 is connected across the busses 25 and 24 through the auxiliary switch 11S1 and a control switch SCR3 which is rendered conducting when the circuit breaker is to be tripped. Preferably, the switch SCR3 is a silicon controlled rectifier similar to the controlled rectifier SCR2. The output circuit of the controlled rectifier SCR3 may be traced from the positive bus 25 through the anode and cathode of the controlled rectifier SCR3, the auxiliary switch 11S1 and the trip coil 11T to the negative bus 24. If desired a network 27 may be connected in shunt with the switch 11S1 and winding 11T between the cathode of the controlled rectifier SCR3 and the negative bus 24. This network 27 may include a resistor R24 serially connected with a capacitor C12 and the series connection shunt connected with a resistor R23.

When the controlled rectifier SCR3 is to be fired, a transformer TR1 is pulsed from an amplifying oscillating network 28. For this purpose, the transformer TR1 is provided with a secondary winding 29 connected between the gate and cathode of the controlled rectifier SCR3 and a primary winding 30 pulse energized by the network 28. The network 28 comprises a first transistor T13, a second transistor T14 and a unijunction transistor T15. The bases $b1$ and $b2$ of the unijunction transistor T15 are respectively connected to the positive bus 25 through a resistor R58 and to the negative bus 24 through the primary winding 30. A capacitor C27 is connected between the emitter $e$ and base $b2$ through the primary winding 30. The charging circuit for the capacitor C27 extends from the positive bus 25 through a resistor R57 and the capacitor C27 to the bus 24.

Oscillation of the network 28 is initiated and terminated by the blocking and rendering conducting of the transistor T14. For this purpose the collector emitter circuit of the transistor T14 is connected in shunt with the capacitor C27. Conduction of the transistor T14 is controlled by the transistor T13 which has its base connected to the output terminal 31 (FIG. 1A) of the timing unit 15 by means of the bus 32 and a variable resistor RH5. The emitter of the transistor T13 is connected directly to the negative bus 24 and the collector thereof is connected to the comon connection 33 of a pair of series connected resistors R55 and R56 which resistors are in turn connected between the positive bus 25 and the negative bus 24. The base of the transistor T14 is connected to this common connection 33 so that the transistor T14 will be maintained conducting as long as the transistor T13 is held non-conducting and will be blocked whenever the transistor T13 is rendered conducting. It will be noted that the transistor T14, when conducting, prevents the capacitor C27 from charging whereby the potential of the emitter of the transistor T15 is held at such a low potential that the unijunction transistor T15 can not be rendered conducting. When, however, the transistor T14 is rendered non-conducting by the conduction of the transistor T13, the low impedance circuit across the capacitor C27 is effectively removed and the potential of the emitter of the transistor T15 increases in potential due to the charging of the capacitor C27 through the resistor R57. When a critical potential is reached, the transistor T15 conducts. Conduction of the transistor T15 serves to discharge the capacitor C27 through the primary windings 30 of the transformer TR1 whereby the secondary winding 29 provides a conducting pulse to the controlled rectifier SCR3. As long as the transistor T14 remains blocked the capacitors C27 will be periodically charged and discharged through the transformer TR1 whereby conduction of the controlled rectifier SCR3 is assured as long as the fault responsive signal is applied by the bus 32.

A capacitor C25 (FIG. 1B) is connected between the bus 32 and the negative bus 24 and serves to assure a slight time delay in the application of the conducting signal to the transistor T13. This prevents actuation of the oscillator network 28 by a brief transient. Resistors R21 and TH3 are series connected between the negative bus 24 and the common connection of the resistor RH5 and the base of the transistor T13. The capacitor C25 is normally maintained discharged by two normally conducting transistors T3 and T4 which have their collectors and emitters connected in series with each other and in shunt with the capacitor C25. The base of the transistor T4 is connected to the base of the transistor T1. Consequently, when the transistor T1 turns on to discharge the capacitor unit CA1, the transistor T4 turns on to discharge the capacitor C25 (assuming that the transistor T3 is turned on).

Conduction of the transistor 26 is controlled by the same signal which controls the transistors T1 and T4. For this purpose the transistor 34 has its emitter connected to the negative bus 24 and its collector connected through a resistor 35 to the positive bus 23. The base of the transistor 34 is connected through a blocking diode to the conductor which connects with the bases of the transistors T1 and T4. The transistors T1, T4 and 34, in the absence of a fault, will be maintained conducting. The base of the transistor 26 is connected to and disconnected from the bus 24 through the emitter-collector circuit of the transistor 34. Since the transistor 34 is normally held conducting, the transistor 26 normally will be held non-conducting and the energization of the bus 25 is controlled by the relay AR. When, however, the conducting signal is removed from the transistors T1, T4 and 34, the base of the transistor 26 is effectively connected to the positive bus 23 through the resistor 35 and the transistor 26 conducts to connect the positive bus 25 to the positive bus 23.

When the transistor T1 turn off to permit a timing operation (charging of the capacitor units CA1), the transistor T4 turns off to place the capacitor C25 in the base drive circuit of the transistor T14 of the oscillating network 28 in effective charging condition. When the Zener diode Z11 breaks over as a consequence of the timing out of the timing capacitor unit CA1 the capacitor C25 charges and current flows from the capacitor unit CA1 through the resistor RH5 to establish base drive current in the transistor T13. This, as described above, results in the periodic energization of the transformer TR1 and the application of a gate signal to the controlled rectifier SCR3. Conduction of the rectifier SCR3 completes a circuit through the trip coil 11T and the circuit breaker 11 is tripped to open its main contacts.

In opening its main contacts, the circuit breaker 11 interrupts the flow of current to the fault. Consequently, the voltage across the voltage divider R3, R2 and RH1 drops to zero. This interrupts the flow of gate current to the controlled rectifier SCR2 and it will not be refired and will cease conducting under control of the network R8–C3. Inasmuch as the controlled rectifier SCR2 is turned off, sufficient current now flows through the emitters of the transistors T1, T4 and 34 to turn them on. The transistors T1 and T4 promptly discharge the capacitor unit CA1 and the capacitor C25 (assuming that the transistor T3 is conducting) and removes the base drive signal of the transistor T26. If the switch SW1 is open and the relay contacts AR1 are open the circuit breaker 11 will reamin tripped. If the switch SW1 is closed and the relay contacts AR1 are open the bus 25 will remain energized and the breaker will be reclosed in the manner described below under normal conditions with the relay AR energized and the bus 25 energized through the contacts AR1. As a result of the tripping of the circuit breaker 11, the current flowing through the trip coil 11T is interrupted and the magnitude of the current flow through the output circuit of the controlled rectifier SCR3 drops sufficiently to cause this controlled rectifier to turn off and return control of the conduction of the controlled rectifier to its gate.

In relay design it is desirable to match certain periods or to provide a predetermined relation between certain variable quantitites such as the relation between line current and the output of the timing unit. For example, such matching is desirable in order to insure a proper coordination among relays employed for a protecting electrical system.

It will be recalled that the tripping of the circuit breaker 11 in response to a line current above minimum tripping value takes place with a substantial delay which is determined by the capacitor unit CA1 and its associated charging circuit including the resistors R14, R15, R16, R17, R18, R49 and the Zener diodes Z2 and Z3. Additional control of the timing may be obtained by the insertion of the varsitors V1, V2, V3, V4 and the Zener diodes Z4, Z5 and Z6 which are connected in the charging circuit of the capacitor unit CA1 by means of the curve selector 36 depending upon the location of its connector plug 36P. This feature is more specifically described and claimed in the copending application of myself and G. J. Marieni, Ser. No. 200,129, filed June 5, 1962 for Circuit-Controlling Systems. A further detailed description thereof in this application is not believed warranted.

For some applications, it is desirable to provide a tripping operation of the circuit breaker 11 in response to line current or zero sequence current flowing in a protective polyphase system. In the specific embodiment of FIG. 1A, a transformer CTG has its adjustable primary winding connected in the residual circuit of the current transformers CTA, CTB and CTC for energization in accordance with the zero sequence current of the protected system. The secondary winding of the transformer CTG is connected across the input terminals of a full wave rectifier DG which is assumed to be of the bridge type. The output voltage of the rectifier is applied across a resistor R1 and is filtered by capacitor C1. The same voltage appears across the resistor R4 and a minimum voltage or threshold device Z8 in series and across a voltage divider comprising the resistors R5 and RH2 in series. The minimum voltage device 28 may be a Zener diode. The resistor RH2 is shown to be adjustable. As the voltage output of the rectifier DG increases, a point is reached at which the minimum voltage device 28 breaks over to render the resistor R4 effective for loading the rectifier.

The voltage output of the voltage rectifier DG is applied across a capacitor unit CA2 through resistors R9, R19 and RH4. The capacitor unit may include one or more capacitors, three capacitors C5, C6, and C7 being shown in parallel in FIG. 1A. The resistor RH4 has an adjustable resistance.

It will be noted that a minimum voltage or threshold device, which preferably is a Zener diode, Z12 is connected across the resistor R9. As the current through the resistor increases, the voltage across the resistor reaches a value sufficient to break over the Zener diode. Thus, for larger values of current the resistor R9 has no effect on the charging characteristics.

For low values of zero sequence current, the capacitor GA2 is maintained in a discharge condition by a suitable control switch such as a transistor T2 which has its main circuit connected across the capacitor unit GA2. A current sufficient to maintain the transistor T2 turned on is supplied to the input circuit of the transistor through a circuit which may be traced from the positive terminal of the source of direct voltage 19 through a resistor R10, a Zener diode Z10, a resistor R18 and the base-emitter circuit of the transistor T2 to the negative terminal. The base of the transistor T3 and the base of the transistor 34 are also connected to be energized from this same circuit so that the transistors T3 and 34 will become non-conducting to permit capacitor C25 to charge and the transistor 26 to conduct in the event of a zero sequence fault current in much the same manner as described with respect to the transitsors T1, T4 and 34.

When the capacitor unit CA2 is to start a timing operation, a switch SCR1 is closed to shunt the input or control circuit of the transistor T2. This turns the transistor T2 off and permits a capacitor unit CA2 to charge. The shunting switch is preferably a silicon controlled rectifier SCR1. This controlled rectifier has its anode connected to a point intermediate the resistor R10 and Zener diode Z10, its cathode connected to the emitter of the transistor T2 and its gate connected to a point intermediate the resistors RH2 and R5 through a minimum voltage or special device such as a Zener diode Z9. Resistors R11 and R12 are connected between the gate and the cathode of the controlled rectifier SCR2. To facilitate turn off of the controlled rectifier, a capacitor C4 is connected across the resistor R10 in a manner described in connection with the turning off of the conrtolled rectifier SCR2 by the resistors R8 and C3.

A transistor T2 and the silicon controlled rectifier SCR1 cooperate to control the charge and discharge of the capacitor unit CA2 in a manner in which will be understood from the discussion of the control of the charge and discharge of the capacitor unit CA1 by the transistor T1 of the controlled rectifier CR2. Although shaping components similar to those employed with the capacitor unit CA1 may be associated with the capacitor unit CA2 a less complicated shaping control suffices for the capacitor unit CA2.

The voltage across the capacitor unit CA2 is applied to the output terminal 31 through a minimum voltage or threshold device, such as a Zener diode Z11G and a rectifier D17. As the voltage across the capacitor unit CA2 increases, a value is reached at which the Zener diode Z11G breaks over to supply current to the bus 32 for charging of the capacitor C25 and initiation of conduction of the transistor T13 to cause the network 28 to pulsatingly energize the silicon controlled rectifier SCR3 to actuate the circuit breaker 11 generally as described above in connection with the energization of the terminal 31 from the timing unit 15.

The pattern of tripping and closing operations of the circuit breaker 11 is determined by a stepping device or switch which may be of either static or electromechanical construction. In the specific embodiment of FIGS. 1A, 1B and 1C, the stepping switch is of electromechanical construction and includes an integrator coil SS, seven levels of contacts, a homing contact HC which is open only when the stepping switch is in a reset or home position, and two stepping contacts SS1 and SS2. Although the stepping switch may have any desired number of positions, it will be assumed that it has ten positions as shown in FIGS. 1B and 1C. In its reset or home condition the stepping switch occupies position 10 wherein the movable brush for each level engages the contact 10 for such level. The number 8 position of the stepping switch is the lockout position wherein each movable brush of a level engages the contact 8 for such level. For example, the brush for level 3 engages the associated contact 8 to complete an energizing circuit from the positive terminal of the battery 19 through the bus 25, the contacts SS1 of the stepping switch, the brush and contact member 8 of level 3 of the stepping switch, the lockout light LL, a resistor RLL, and the auxiliary switch 11S4 of the circuit breaker 11 and the bus 24 to the negative terminal of the battery 19. The illumination of the lockout light LL indicates that the circuit breaker 11 is locked out and thus prevented from reclosing automatically.

If desired, a rectifier D22 is connected across the coil of the tripped coil 11T in order to permit discharge of energy stored in this coil when the coil is deenergized.

For each brief energization of the trip coil 11T an electric pulse is delivered to the integrator coil SS for the purpose of stepping the stepping switch to the next position. It will be noted that a rectifier D28 is connected in a conventional manner across the integrator coil to permit discharge of energy stored in the coil after the coil is deenergized.

Let it be assumed that the stepping switch is in position 10 at the time the circuit breaker 11 trips. The energization of the trip coil 11T is accompanied by the energization of the control circuit of the switch SCR7, which conveniently may be a silicon controlled rectifier, through a circuit which may be traced from the positive terminal of the battery 19 through the bus 25, the anode and cathode of the controlled rectifier SCR3, the auxiliary switch 11S1, resistors R45 and R46, a rectifier D30, the brush and contact 10 of the second level, and the integrator coil SS and bus 24 to the negative terminals of the battery 19.

The voltage across the resistor R46 is applied between the gate and cathode of the controlled rectifier SCR7. The controlled rectifier fires to connect the coil SS across the battery 19 through the break contacts SS1 of the stepping switch, the anode and cathode of the controlled rectifier, the rectifier D30, and the brush and contact 10 of the second level. The energized coil SS lowers its armature as viewed in FIG. 1C to cock the spring SSP and to open its make contacts SS1. Upon opening, the contacts SS1 deenergize the coil SS and the spring SSP resets the armature to advance the stepping switch one position. The integrator coil SS now is energized to the contacts SS1 and the brush and contact one of level 3 to advance the stepping switch to its position 2. In this way the stepping switch automatically steps from each odd position to the next in position.

In position 2 on the stepping switch the brush engages contact 2 of the third level. A panel OL is provided with common terminal Ct and a number of openings 1, 2, 3 and 4. When a plug PL is in the opening 1, the contact 2 or the third level of the stepping switch is connected through the plug to the upper terminal of the integrator coil SS. In a similar manner, the plug may be inserted in openings 2 or 3 to connect contacts 4 or 6 of this level respectively to the upper terminal of the integrator coil. The opening in which the plug is inserted determines the number of tripping operations permitted for the circuit breaker before the circuit breaker locks out. It will be noted that the rectifier D26 is connected between the contacts 4 and 6 and that a rectifier D27 is connected between the contacts 2 and 4 of the third level of the stepping circuit.

As the stepping switch steps from position 1 to position 2, the contacts SS1 momentarily are opened. If the plug PL is located in opening 1 of the panel OL, the reclosure of the contacts SS1 reenergizes the integrator coil SS to step the stepping switch to position 3 again momentarily reopening the contacts SS1. The reclosure of the contacts SS1 steps the stepping switch to its position 4 in a manner which will be clear from the preceding discussion. The reclosure of the contacts SS1 as the stepping switch reaches its position 4 completes with the brush and contact for the third level, the rectifier D27 and the plug PL a reenergizing circuit for the integrator coil SS and the stepping switch promptly steps to its position 5. Closure of the contacts SS1 steps the stepping switch to its position 6 and by a sequence similar to that followed in stepping position 1 to position 2.

When the brush reaches the contact member 6 of level 3 of the stepping switch the reclosure of the contacts SS1 again completes an energizing circuit for the integrator coil through the brush and contact 4 of the third level, the rectifiers D26 and D27, and the plug PL. This steps the stepping switch to its position 7 from which the stepping switch automatically steps to position 8, the lockout position wherein the lockout light LL is illuminated. Thus, insertion of the plug PL and the opening 1 has limited the circuit breaker to one tripping operation before lockout. In an analogous manner, insertion of the plug in opening 2 or opening 3 of the panel OL restricts the circuit breaker to two or three tripping operations, respectively before lockout.

The time delay in reclosure of the circuit breaker for each operation in which reclosure is called for is determined by a capacity unit CA4 and its associated circuit. The capacity unit CA4 includes one or more capacitors, and capacitors C13 and C14 are illustrated as connected in parallel to form the capacity unit CA4. The time delay introduced by the reclose timer depends on which of five resistors R32, R31, R30, R29, or R28 is selected for controlling the charging of the capacity unit CA4. Inspection of FIG. 1C shows that the right hand terminal of each of the resistors is connected to the right hand terminal of the capacity unit CA4. The left hand terminals of the resistors are connected respectively to five connection screw sockets RT1, RT2, RT3, RT4 and RT5 located on each of three conductive reclose timer panels or tap blocks RTA, RTB and RTC. Each of the contacts 2, 4 and 6 of the fourth level of the stepping switch is connected to a separate one of three panels RTA, RTB and RTC. Plugs PLA, PLB and PLC are associated respectively with the panels RTA, RTB and RTC for connecting each of the contacts 2, 4 and 6 to any of the resistors R28 to R32.

As representative of suitable parameters, the resistor R32 may have a small value of resistance to provide rapid reclosure and the resistors R31, R30, R29 and R28 may introduce time delays of the order of 2, 15, 30 or 45 seconds respectively. It will be noted that the brush of the fourth level of the stepping switch connects any contact of the level which it engages through a resistor R25 to the positive terminal of the battery 19.

When the brush engages any of the contacts 1, 3, 5, 7 or 9 of the fourth level of the stepping switch transistor T10 is turned on to insure complete discharge of the capacity unit CA4. For example, when the brush engages the contact 1, current flows from the positive terminal of the battery 19 to the resistor R25, the brush and contact 1 of the fourth level, the rectifier D34, the resistor R35 and the base and emitter of the transistor T7 to the negative terminal of the battery. In turning on, the transistor assures discharge of the capacitor unit before the next charging operation thereof. As further assurance of full discharge of capacitor unit CA4, contacts 1, 3, 5 and 7 of the seventh level of the stepping switch are connected to the right hand terminal of the capacitor unit CA4 whereas the brush for this level is connected to the left hand terminal of the capacitor unit as shown in FIG. 1C.

When the brush engages any of the contacts 2, 4 or 6 of the fourth level capacitor unit CA4 starts to charge at a rate determined by the position of the plug PLA, PLB or PLC associated with the selected contact. When the voltage across the capacitor unit CA4 reaches a value sufficient to break down a minimum voltage device such as a Zener diode Z14, current is supplied to the input circuit of a transistor T5 for the purpose of turning the transistor on through a circuit which may be traced from the right hand terminal of the capacitor unit through the Zener diode Z14, the base and emitter of the transistor T5, a rectifier D23 and a resistor R26 to the left hand terminal of the capacitor unit. A transient suppressing capacitor C16 is connected across the resistor R26.

Inasmuch as the transistor T5 is now turned on, current flows from the positive terminal of the battery 19 through the resistor R25, the resistor R33, the collector and emitter of the transistor T5, the rectifier D23 and the resistor R26 to the negative terminal of the battery.

The resistor R26 is in the input circuit of a silicon controlled rectifier SCR5 and the voltage across the resistor now is sufficient to turn on the controlled rectifier. Current is now supplied to a motor close relay MCR from the positive terminal of the battery 19 through bus 25, the contacts SS1, the auxiliary switch 11S5 of the circuit breaker 11, the motor close relay MCR, the anode cathode of the control rectifier SCR5 and the negative bus 24 to the negative terminal of the battery 19. The motor close relay MCR closes its contacts MCR1 to complete with the auxiliary switch 11S6 of the circuit breaker 11 an energizing circuit for the closing motor 11C of the circuit breaker. This closing motor may be energized from any suitable source such as a 240 volt alternating current source ACS. A rectifier D24 is connected across the motor close relay MCR in a conventional manner to discharge energy stored in the coil when the coil is deenergized. In the event that the source ACS is the same source which supplies the input terminal 20 and it is desired to reclose the circuit breaker 11 with the source deenergized a separate source must of course be provided in any suitable manner.

If the breaker 11 remains closed after any reclosure for a predetermined length of time, a reset timer operates to reset the stepping switch. In the reset position of the stepping switch, the brush and contact 10 of level 3 of the stepping switch completes with a resistor R44 and the contacts SS1 an energizing circuit for the base emitter circuit of a transistor T9. This turns the transistor on to complete a discharge circuit for capacitor unit CA3 of the reset timer.

The capacitor unit CA3 may comprise any number of capacitors. In the specific embodiment of FIG. 1C four capacitors C17, C18, C19 and C20 are connected in parallel to constitute the unit CA3.

The upper terminals of five resistors R36, R37, R38 and R39 and R40 are all connected to the lower terminal of the capacitor unit CA3. The lower terminals of the resistors are connected respectively to connection screw sockets on a tap block or conductor panel RE having a manually operated plug PLE which may be inserted to connect any of the lower terminals of the resistors to the brush of level 1 of the stepping switch. The contacts 1 to 9 for this level are connected through the auxiliary switch 11S3, a resistor TH9 (which may have a negative temperature coefficient of resistance to compensate for changes with temperature of the voltage needed to fire the controlled rectifier SCR6) and a constant voltage device such as Zener diode Z13 to the negative terminal of the battery 19. It will be noted that the Zener diode Z13 is connected to the resistors TH9 and R25 across the battery. Consequently, the voltage across the Zener diode is substantially constant and forms a suitable source for energizing the reset timer.

The five resistors connected to the capacity unit CA3 have resistance values selected to provide desired time delays for the rest timer. For example, the resistors R40, R39, R38, R37 and R36 may be selected to provide resepctively delays of 10, 30, 60, 90 and 120 seconds.

After a tripping operation of the circuit breaker 11 the brush of level 3 of the stepping switch is displaced from the contact 10 and is no longer effective for establishing a discharge circiut for capacity unit CA3. However, as long as the circuit breaker remains tripped and the contacts SS1 are closed current is supplied from a positive battery terminal through the bus 25, the contacts SS1, the auxiliary switch 11S5, the rectifier 31, the resistor R44, the base emitter circuit of the transistor T9 and bus 24 to the negative battery terminal to turn on the transistor and thus assure discharge of the capacity unit CA3. Reclosure of the circuit breaker opens the auxiliary switch 11S5 to turn off the transistor T9 and thus to permit charging of the capacitor unit CA3. The reclosure of the circuit breaker additionally closes the auxiliary switch 11S3 to connect the capacity unit CA3 across the Zener diode Z13 through the resistor selected by the plug PLA through level 1 of the stepping switch and through the resistor TH9.

The capacitor unit CA3 now charges at a rate determined by the selected resistor until the voltage becomes sufficient to breakdown a minimum voltage device such as a Zener diode Z15. The voltage across the capacitor unit CA3 directs a current through a circuit which may be traced from the lower terminal of the capacitor unit through the Zener diode Z15, the base and emitter of the transistor T8, a rectifier D25, a resistor R41 and the integrator coil SS to the upper terminal of the capacitor unit. The current flowing in this circuit is insufficient to operate the integrator coil SS. It is also insufficient to turn on a switching device such as a silicon controlled rectifier SCR6 which has the resistor R41 in its input circuit. A transient suppressing capacitor C21 is connected across the resistor R41.

Inasmuch as the transistor T8 is now turned on, current is supplied from the positive terminal of the battery 19 through the resistor R25, resistor R42, the collector and emitter transistor TA, the rectifier D25, the resistor R41, and the integrator coil SS to the negative terminal of the battery 19. This current is insufficient to operate the integrated coil SS but is sufficient to fire the controlled rectifier SCR6.

Current now flows from the positive terminal of the battery 19 through the bus 25, the contacts SS1 of the stepping switch, homing contacts HC, the anode and cathode of the controlled rectifier SCR6, the integrator coil SS, and the negative bus 24, to the negative terminal of the battery 19. The homing contacts HC are cam operated by the stepping switch to open only when the switch is in the home or reset position. As the stepping switch steps to its next position, the contacts SS1 open to deenergize the integrated coil SS and thereafter reclose to reenergize the coil of the stepping switch for another stepping operation. As a result of this self-stepping operation, the stepping switch continues to step until it reaches the position 10 wherein the homing contacts HC are open and the recloser control is completely reset for future tripping and reclosing operations.

It will be recalled that closure of the switches ILO1 and ILO2 (FIG. 1B) conditions the system for a prompt tripping operation. These switches are a part of a three pole single throw switch unit which includes a switch ILO3 (FIG. 1C). When the switch unit is operated for lockout purposes, closure of the switch ILO3 prepares an energizing circuit for the coil SS which may be traced from the positive terminal of the battery through the bus 25, the self-stepping contacts SS1, the auxiliary switch 11S5, a rectifier D29, the switch ILO3, the brush and contacts (assumed to be the contact 10) of level 2 of the stepping switch, the integrated coil SS and the negative bus 24 to the negative terminal of the battery 19. Tripping of the circuit breaker closes the auxiliary switch 11S5 to complete a self-stepping circuit for the stepping switch which now steps to its number 8 or lockout position.

By inspection of FIG. 1B it will be noted that the switch ILO1 is arranged to be shunted by selected position of level 6 for stepping switch. The brush for level 6 of the stepping switch is connected to the left hand terminal of the switch ILO1. Each of the desired contacts of this level may be selectively connected to the right hand terminal of the switch ILO1 through operation of a plug PL1. To this end the plate ILO5 has an electroconductive connection to the right hand terminal of the switch ILO1 and has four sockets for reception of the plug PL1. These sockets have conductor segments connected respectively to the contacts 10, 2, 4 and 6 for level 6 of the stepping switch. Consequently, as the plug PL1 is in one of the sockets such as that corresponding to position 4 of the stepping switch and if the switch ILO1 is opened, when the stepping switch reaches its fourth position, the brush for level 6 engages the contact 4 of level 6 to condition the circuit breaker for a prompt tripping operation. A similar shunting arrangement is provided for the switch ILO2 as represented by a plate ILO6 having four sockets for reception of a plug.

Remote control for tripping the circuit breaker is provided by a switch unit including a switch CST1 (FIG. 1B) and a switch CST2 (FIG. 1C). Closure of the switch CST1 connects the trip coil of the circuit breaker across the battery 19 through the auxiliary switch 11S1 to trip the circuit breaker. Closure of the switch CST2 connects the integrator coil SS to level 2 of the stepping switch and the self-stepping contacts SS1 across the battery 19 for the purpose of locking out the system in the manner previously described.

Closure of the circuit breaker can be initiated from a remote point by means of a single pole, single throw switch CSC (FIG. 1C). When the switch CSC is closed, it connects the resistor R26 across the regulated voltage appearing across the Zener diode 13 to a capacitor C15 and the resistor R25. The resulting pulse of currents through the resistor R26 produces a voltage thereacross sufficient to fire a controlled rectifier SCR5 which now connects the motor close relay MCR across the battery 19 through the auxiliary switch 11S5. The relay closes its contacts MCR1 to establish a closing circuit for the closing motor 11C through the auxiliary switch 11S6. Inasmuch as only one pulse is produced for each closure of the switch CSC, repeated reclosures or pumping of the circuit breaker do not occur if the circuit breaker trips while the switch is held closed. When the switch CSC is opened, the capacitor C15 discharges through the resistor R26 and resistor R27.

When the load supplied through the circuit breaker 11 has been energized for a substantial period of time, the closure of the circuit breaker may be accompanied by a substantial flow of current for a short period of time. This current which flows during the brief period may be substantially above the normal rate of load current which flows through the circuit breaker after the load has been picked up for a substantial time period. To prevent a tripping operation of the circuit breaker under these conditions a switch unit CLP (FIG. 1A) is provided. When closed, the switch CLP connects a resistor RCL across the resistors R2 and RH1 to lower the tripping sensitivity of the circuit breaker to line current. During this period, the sensitivity of the system may still be sufficient to assure tripping operation in response to an extremely large fault current. After the lapse of a time sufficient to assure proper pickup of the load, the switch CLP may be opened to restore full sensitivity to the system. For similar reasons, a switch CLP1 may be connected across the secondary winding of the transformer CTG.

The condition of the circuit breaker may be shown in a conventional manner by a red lamp RL and a green lamp GL. The auxiliary switches 11S2A and 11S2B connect the red lamp or the green lamp through a resistor RL1 across the source ACS dependent upon whether the circuit breaker is closed or opened. Conveniently, the switches CST2, CST1, CSC and CLP are ganged for operation by a single three position handle. In the "center" position of the handle, all of the switches are opened. In the "closed" position of the handle switches CSC and CLP are closed. In the "trip" position of the handle switches CST2 and CST1 are closed.

From the preceding discussion it is clear that the system of FIG. 1 provides an extremely reliable and flexible operation of a circuit breaker. The overall operation of the system may be summarized as follows.

For a manual closing operation, the switches CLP and CLP1 are closed to desensitize the tripping control of the circuit breaker. In addition a switch CSC is closed for the purpose of energizing the motor closed relay MCR which initiates a closing operation of the circuit breaker 11. After expiration of a period of time sufficient to assure substance of load currents below cold or pickup values, the switches CLP, CLP1 and CSC are opened. The opening of the switches CLP and CLP1 restores full sensitivity to the system.

If a fault occurs resulting in a flow of line currents of excessive fault magnitudes, the capacity unit CA1 is charged to a value sufficient to initiate a tripping operation of the circuit breaker 11. One of the many time delay characteristic curves as shown in the said copending application may be selected by operation of the curve selector 36 and of the adjustable resistors R16 and RH3.

In an analogous manner the fault occurs resulting in the flow of substantial zero sequence current, the capacitor unit CA2 charges to a value sufficient to trip the circuit breaker 11. If the plug PL1 is inserted in the socket in the plate ILO5 which corresponds to the position of the stepping switch, a relatively prompt tripping operation of the circuit breaker is obtained in response to line current. In an analagous manner, a plug inserted in the socket of a plate ILO6 which corresponds to the position of the stepping switch is effected to produce a relatively prompt tripping of the circuit breaker in response to zero sequence current.

Each tripping operation of the circuit breaker advances the stepping switch. Following the tripping operation of the circuit breaker 11 provides that no lockout occurs a time delay in reclosing is measured by the charging of the capacitor unit CA4 which is charged at a rate dependent on the position of the stepping switch and the positions of the plugs PLA, PLB and PLC. Upon the expiration of the time delay determined by the charging of the capacitor unit CA4, the circuit breaker is reclosed. If the fault persists, the circuit breaker again trips and advances the stepping switch. A new reclosing time delay is measured by the charging of the capacitor unit CA4, provided that no lockout occurs, and on the expiration of this time delay the circuit breaker is again reclosed. The tripping and reclosing of the circuit breaker continues until lockout of the breaker occurs, until the circuit breaker remains closed for a predetermined time.

Upon each reclosure of the circuit breaker 11, a reset time delay is measured by the charging of a capacitor unit CA3 at a manually selected rate. The reset timer is used for each operation of the circuit breaker. Consequently, the whole time delay selected for the reset timer is available for each reclosure of the circuit breaker. If the circuit breaker remains reclosed for a time sufficient to permit expiration of the reset time delay, the charge and the capacitor unit CA3 reaches a value sufficient to initiate energization of the integrator coil to reset the stepping switch to its position 10.

If it is desired to limit the operation of the circuit breaker to a predetermined number prior to lockout, the appropriate number of operations may be selected by proper location of the plug PL and PL1 of the sockets in the plates OL. If the circuit breaker fails to remain closed for the time required for operation of the reset timer prior to arrival of the stepping switch at the position selected by the plug PL, the stepping switch steps to its lockout position.

With the control in its lockout position, the light LL is illuminated to indicate that the control is in such lockout position.

If prompt tripping and lockout are desired for the circuit breaker, the switch unit including the switches IL101, IL102, and IL103 is operated to closed condition. If the circuit breaker is closed at the time of such operation, it is conditioned to trip promptly in response to its aligned or zero sequence current. In addition, the stepping switch is stepped to its lockout position.

If manual or remote control of the circuit breaker is desired, the switch which includes the switches CLP, CSC and CST is operated in the closed direction to indicate a closing operation of the circuit breaker. This switch is operated to trip condition for the purpose of tripping the circuit breaker. Such operation also results in stepping of the stepping switch to its lockout position.

If the circuit breaker 11 is in its lockout position at the time this switch is operated in the closed direction, the circuit breaker recloses. This reclosure is accompanied by reclousre of the zero switch LS3 to initiate a timing operation of the reset timer. If the circuit breaker remains closed for the time for which a reset timer is set, the capacitor unit CA3 charges to a value sufficient to initiate the firing of the controlled rectifier SCR6 and this resets the stepping switch to its position 10.

Although the invention has been described with reference to certain specific embodiments thereof, numerous modifications falling within the spirit and scope of the invention are possible.

What is claimed and is desired to be secured by United States Letters Patent is as follows:

1. In a protective relaying apparatus, a pair of terminals adapted to be connected to a source of electrical energy, a battery, a pair of busses, a load circuit connected to said busses, a first switching device having a circuit switching element and a sensing element for controlling said switching element, first circuit means connecting said pairs of terminals to said pair of busses and including said switching element whereby said pair of busses may be connected to and disconnected from said pair of terminals, second circuit means connecting said sensing element to said first circuit means for controlling the energization of said sensing element, said sensing element being operable in response to an energized condition of said terminals below a predetermined minimum magnitude to actuate said switching element to disconect said pair of busses from said terminals, a fault sensing network, a second switching device, said second switching device having a second circuit switching element and a second sensing element for controlling said switching element, third circuit means connecting said pair of busses to said battery for energization from said battery and including said second switching element, fourth circuit means connecting said second sensing element to said fault sensing network whereby said second sensing element is effective to actuate said second switching element to connect said pair of busses to said battery in response to the actuation of said fault sensing network.

2. In a protective relaying apparatus, a pair of terminals adapted to be connected to a source of electrical energy, a battery, first and second pairs of busses, first circuit means connecting said battery between said first pair of busses, a first switching device having a circuit switching element and a sensing element for controlling said switching element, second circuit means connecting said pair of terminals to said second pair of busses and including said switching element whereby said second pair of busses may be connected to and disconnected from said pair of terminals, an electrical load connected between said second pair of busses, third circuit means connecting said sensing element to said second circuit means for controlling the energization of said sensing element as a function of the energized condition of said terminals, said sensing element being operable when the magnitude of the energized condition of said terminals falls below a predetermined minimum magnitude to actuate said switching element to disconnect said second pair of busses from said terminals, a fault controlled network connected to said first pair of busses for deriving energy therefrom, a second switching device, said second switching device having a second circuit switching element and a second sensing element for controlling said second switching element, fourth circuit means connecting said second pair of busses to said battery for energization therefrom and including said second switching element, fifth circuit means connecting said second sensing element to said output circuit of said fault controlled network whereby said second sensing element is effective to actuate said second switching element to connect said second pair of busses to said battery in response to the actuation of said fault controlled network.

3. In a protective relaying apparatus, a pair of terminals adapted to be connected to a source of electrical energy, a battery, first and second pairs of busses, first circuit means connecting said battery between said first pair of busses, a first switching device having a circuit switching element and a sensing element for controlling said switching element, second circuit means connecting said pairs of terminals to said second pair of busses and including said switching element whereby said second pair of busses may be connected to and disconnected from said pair of terminals, third circuit means connecting said sensing element to said second circuit means for controlling the energization of said sensing element, said sensing element being operable in response to an energized condition of said terminals below predetermined minimum magnitudes to actuate said switching element to disconnect said second pair of busses from said terminals, a fault sensing network having input terminals and output terminals, said output terminals being energized with an electrical quantity having a magnitude which varies as a function of the magnitude of a signal applied to said input terminals, a timing network having control input connections and control output connections and power input connections and a second switching device, said second switching device having a second circuit switching element for initiating the timing function of said timing network having a second sensing element for controlling said second switching element, fourth circuit means connecting said second sensing element to said output terminals of said fault sensing network whereby said second switching element is effective to initiate said timing functions solely when the magnitude of said electrical quantity is within a predetermined range of magnitudes, a third switching element device, said third device having a third circuit switching element and a third sensing element for controlling said third switching element, fifth circuit means connecting said second pair of busses to said battery for energization therefrom and including said third switching element, sixth circuit means connecting said third sensing element to said second switching element and operable to render said third switching element effective to connect said second pair of busses to said battery solely when the magnitude of said electrical quantity is within said predetermined range, a controlling network having input control terminals and power output terminals and power input terminals, the standby power loss of said controlling network being greater than the standby power loss of said timing network, seventh circuit means connecting said input control terminals of said controlling network to said output connections of said timing circuit for energization of said power output terminals of said controlling network as a consequence of the timing out of said timing network, an eighth circuit means connecting said power input terminals of said controlling network to said second pair of busses.

4. In a protecting standby apparatus, a first source of electrical energy, a standby source of electrical energy, a controlling network having a control input connection and a control output connection and a power input connection, a first switching device having a first switching element and a first sensing element and said first sensing element controlling said first switching element, first circuit means connecting said power input connections to said first source of energy and including said first switching element, second circuit means connecting said first sensing element to said first source of energy, said first sensing element being operable to maintain said power input connections connected to said first source of energy solely when the magnitude of an electrical output quantity of said first energy source is greater than a critical value, a second switching device having a second switching element and a second sensing element controlling the conductive condition of its said second switching element, third circuit means connecting said power input connection of said controlling network to said standby source of energy and including said second switching element, a sensing network having an output circuit and an input circuit, fourth circuit means connecting said output circuit of said sensing network to said control input connection of said controlling network, and fifth circuit means connecting said output circuit of said controlling network to said second sensing element, said fifth circuit means being effective to actuate said second switching element to connect said power input connection of said controlling network upon the actuation of said control input connection when and solely when the magnitude of said electrical output quantity is less than said critical value.

5. The combination of claim 4 in which said fourth circuit means includes a timing device, said timing device being effective to delay the actuation of said control input connection with respect to the actuation of said second sensing element.

6. In a protective relaying apparatus, a primary source of electrical energp, a battery, a first and second pairs of busses, means connecting said battery to said first pair of busses, a network including a rectifying circuit and connected between said primary source and said battery, said network further being connected to said second pair of busses for energization thereof from said primary source, said network further including a first controlling device, said controlling device having a first switching element for connecting and disconnecting said second pair of busses to said primary source, said controlling device having a sensing element for controlling said first switching element, first circuit means connecting said sensing element to said primary source to respond to the magnitude of the voltage thereof, said sensing element being effective to actuate said switching element to connect said second pair of busses to said primary source solely when the magnitude of said voltage is above a predetermined value, a second controlling device having a second switching element and second sensing element for controlling said second switching element, second circuit means connecting said first pair of busses to said second pair of busses and including said second switching element, a fault responsive network, an actuating network including a timer and a relaying device said relaying device having a controlled element for initiating the timing function of said timer, said relaying device having a controlling element for controlling the operation of said controlled element, third circuit means connecting said controlling element of said relaying device and said second sensing element to said network for initiating operation of said timer and for actuation of said second switching element to connect said second pair of busses to said first pair of busses, an amplifying network having power input terminals and power output treminals and signal input terminals, said amplifying network including energy consuming devices which consume energy whenever said power input terminals are energized, fourth circuit means connecting said power input terminals to said second pair of busses for energization thereby, a load device connected to said power output terminals, and fifth circuit means connecting said signal input terminals to said timer for actuation thereby at the expiration of its said timing function.

7. A protective relay comprising, a first pair of input terminals adapted to be supplied with a control signal, first and second pairs of busses, a battery connected between said first pair of busses for energizing the same, a semiconductor valve device, said device having a main circuit and a control circuit, a voltage dropping impedance, first circuit means connecting said impedance in circuit with said main circuit between said first pair of busses, a timing network an energy storage device and a timing impedance, second circuit means connecting said timing network across said input terminals, a breakover device, third circuit means connecting said control circuits in series circuit with said breakover device across said input terminals, said breakover device being effective to breakover when the magnitude of said signal exceeds a predetermined magnitude, a first transistor having main electrodes and a control electrode, a second transistor having main electrodes and a control electrode, fourth circuit means connecting said control electrodes to said first circuit means intermediate said voltage dropping impedance and said valve device, fifth circuit means connecting said main electrodes of said first transistor in shunt with said storage device, sixth circuit means connecting said first pair of busses to said second pair of busses and including said main electrodes of said second transistor, a second pair of input terminals adapted to be connected to a main source of potential, a switching device having a power circiut and a sensing circuit for controlling the conductive conditions of its said power circuit, seventh circuit means connecting said second terminals to said battery for maintaining it in charged condition and to said second pair of busses, said seventh circuit means including said power circuit of said switching device, eighth circuit means connecting said sensing circuit to said second terminals whereby said switching device is effective to disconnect said second pair of busses from said second terminals when the potential supplied by said second terminals is below a predetermined value, a power consuming amplifier having power input connections and power output connections and control connections, ninth circuit means connecting said power input connections of said amplifier to said second pair of busses, tenth circuit means connecting said control input connects of said amplifier across said storage device, a load, and eleventh circuit means connecting said load to said power connections of said amplifier.

8. In combination, first and second sets of busses, a first load consuming network connected to said first set of busses for deriving energy therefrom, a second load consuming network connected to said second set of busses for deriving energy therefrom, said second network having an energizable output circuit, said first network having a larger standby power consumption than the standby power consumption of said second network, a first pair of input terminals adapted to be connected to a source of electrical energy, a standby source of electrical energy of limited power and energy capabilities, first and second switching devices, each said device having a power circuit and a control circuit for controlling its associated said power circuit, first circuit means connecting said first set of busses to said input terminals and including said power circuit of said first switching device, second circuit means connecting said control circuit of said first switching device to said input terminals whereby said first set of busses are maintained energized from said terminals solely when the potential supplied by said terminals is above a predetermined minimum magnitude, a standby network including a third and fourth circuit means, said third circuit means connecting said standby source to said second set of busses and including said power circuit of said second switching device, said fourth circuit means connecting said control circuit of said second switching device to said output circuit of said second load consuming network for actuating of said power circuit of said second switching device to render said third circuit means conductive as a consequence of a change in the energized condition of said output circuit of said second load consuming network, said standby network further including means to prevent said third circuit means from being rendered conductive when said first set of busses are energized from said input terminals.

9. The combination of claim 8 in which said second switching device includes three elements and its said power circuit comprises a first pair of said three elements and its said control circuit comprises a second pair of said three elements and it said power circuit conducts solely when said elements of said control circuit are energized at a predetermined relative polarity.

10. The combination of claim 9 in which said second switching device is a semiconductor device and in which said third circuit means includes an asymmetric current conducting device to retard current flow from said first set of busses to said standby source.

11. The combination of claim 8 in which said standby source is a battery, said standby network includes a charging network interconnected said input terminals and said battery for charging said battery from said input terminals, said standby network further including asymmetric means for preventing flow of electrical energy from said battery to said input terminals.

12. In combination, first and second and third busses, a main source of electrical energy, first and second load consuming networks, an emergency source of electrical energy of limited power and energy capabilities and having a second pair of terminals, a first switching device having a first power circuit and a first control circuit for controlling the conducting condition of said first power circuit, a valve device having a plurality of elements, a first pair of said elements comprising a second power circuit and a second pair of said elements comprising a second control circuit, first circuit means connecting said first bus to each of said sources, second circuit means connecting said main source to said second bus and including said first power circuit, third circuit means connecting said main source to said emergency source and to said third bus, said third circuit means including a one way energy flow apparatus to prevent flow of energy from said emergency source to said main source, fourth circuit means connecting said second power circuit between said second and third busses, fifth circuit means for selectively connecting said second control circuit between two of said busses.

13. The combination of claim 12 in which said fourth circuit means includes a one way energy flow device whereby energy can flow solely in a direction toward said second bus.

14. The combination of claim 13 in which said valve device is a triode, one of said second pair of elements is a control element and said fifth circuit means effectively transfers the connection of said control element between two of said busses.

15. In combination, a first pair of input terminals for connection to a source of electrical energy, a battery having terminals, first means including a first one-way energy flow device connecting said input terminals to said battery terminals, a relay having a control element and a switch element, first and second and third busses, second means connecting a first of said battery terminals to said first busses, a first and a second valve device, each said valve device having three electrodes, third means connecting a second of said battery terminals to said second bus and including a first and a second of said electrodes of said first valve device, fourth means connecting said second battery terminal to said third bus, an impedance element, fifth means connecting said first battery terminal to said third bus and including said impedance element and a first and a second of said electrodes of said second valve device, sixth means connecting said second terminal of said battery to said second bus and including said switch element, switch means connecting a third of said electrodes of said first valve device to said fifth means intermediate said impedance element and said second valve device, and eighth means connecting said control element for energization from said input terminals whereby said control element will maintain said element in circuit making condition solely when the potential at said input terminals is above a predetermined minimum magnitude.

16. The combination of claim 15 in which said third means includes a one way energy flow device.

17. The combination of claim 16 in which said valve devices are transistors, said first and second electrodes are collectors and emitters, said third electrode is a base, and each said one way device is a rectifier.

References Cited

UNITED STATES PATENTS

| | | | |
|---|---|---|---|
| 2,917,638 | 12/1959 | Hulsey et al. | 307—86 |
| 3,293,446 | 12/1966 | Baude | 307—86 X |
| 3,317,741 | 5/1967 | McClain | 307—86 X |
| 3,317,791 | 5/1967 | Price et al. | 317—22 |

MILTON O. HIRSHFIELD, *Primary Examiner.*

J. D. TRAMMELL, *Assistant Examiner.*